US006732809B2

(12) United States Patent
Karadizian et al.

(10) Patent No.: US 6,732,809 B2
(45) Date of Patent: May 11, 2004

(54) APPARATUS FOR DISTRIBUTING GRANULAR MATERIAL

(75) Inventors: Richard Zaven Karadizian, Westford, MA (US); Peter Paul Bouchard, Ayer, MA (US)

(73) Assignee: Kidde-Fenwal, Ashland, MA (US)

( * ) Notice: Subject to any disclaimer, the term of this patent is extended or adjusted under 35 U.S.C. 154(b) by 0 days.

(21) Appl. No.: 10/336,100

(22) Filed: Jan. 3, 2003

(65) Prior Publication Data

US 2003/0205390 A1 Nov. 6, 2003

Related U.S. Application Data

(60) Provisional application No. 60/378,429, filed on May 6, 2002.

(51) Int. Cl.[7] ......................... A62C 35/02; F16K 17/14; F16K 17/40

(52) U.S. Cl. ............................ 169/28; 169/26; 169/66; 169/68; 137/68.23

(58) Field of Search ............................. 169/28, 26, 66, 169/68, 56; 137/68.23, 68.19, 68.27; 220/89.2, 88.3

(56) References Cited

U.S. PATENT DOCUMENTS 4,394,868 A * 7/1983 McLelland ............... 137/68.13
4,702,322 A * 10/1987 Richardson .................. 169/28
5,031,701 A * 7/1991 McLelland et al. ........... 169/58
5,038,866 A * 8/1991 Kern et al. .................... 169/28
5,199,500 A * 4/1993 Norman et al. ............... 169/51
5,232,053 A * 8/1993 Gillis et al. .................... 169/58
5,291,952 A * 3/1994 Arend ......................... 169/71
5,465,795 A 11/1995 Galbraith et al.
5,647,438 A * 7/1997 Chatrathi et al. ............. 169/58
2002/0027143 A1 3/2002 Schoenrock et al.

FOREIGN PATENT DOCUMENTS

GB 2 164 252 A 3/1986

* cited by examiner

*Primary Examiner*—Gene Mancene
*Assistant Examiner*—Darren Gorman
(74) *Attorney, Agent, or Firm*—Merchant & Gould, P.C.

(57) ABSTRACT

An apparatus for explosion suppression. The apparatus includes a flange proximate a volume wherein explosions are to be suppressed, a burst seal affixed to the flange, and a spreader insert proximate the flange. The seal is made to burst when pressure is applied to it. The insert defines apertures therethrough that form the shape of at least one annulus. The apertures are aligned with the seal, so that suppressant supplied to the insert passes through the insert into the protected volume. The insert directs suppressant passed therethrough under pressure with an effective explosion suppressing spread of at least 90 degrees.

19 Claims, 6 Drawing Sheets

106

100

APPARATUS FOR DISTRIBUTING GRANULAR MATERIAL

BACKGROUND OF THE INVENTION

The invention relates to an apparatus for distributing granular material.

The invention relates more particularly to an apparatus for delivering a granular explosion suppressant to the site of an explosion, an incipient explosion, or a deflagration.

There are many types of granular materials, used for many applications. In some applications, it is desirable to distribute the material in a particular pattern. The distribution pattern is sometimes referred to as the "spread" of the granular material.

For example, some types of explosion suppressing systems operate by blowing granular suppressants into a location that is to be protected from explosion. Explosion suppressing systems are widely used in applications where potentially explosive substances such as dusts or vapors are present, especially when those explosive substances are sealed or otherwise enclosed within a limited volume. Examples of locations that might be protected include, but are not limited to, granaries, flour mills, food and pharmaceutical processing machines, petrochemical distillation equipment, solvent baths, etc.

In explosion suppressing systems it is often advantageous to produce a broad, relatively even distribution of suppressant material, without the necessity of moving the distribution device. Such a device is described herein as an exemplary embodiment according to the principles of the claimed invention.

However, it is noted that the claimed invention is not limited only to explosion suppression systems. Devices and methods according to the principles of the claimed invention may be suitable for a variety of other applications, as well. For example, when loading grain into silos or bins it is often advantageous to produce a broad and even spread of grain, rather than to produce a pile directly beneath the loading point.

With regard to terminology, it is noted that in the art of explosion suppression, the term "explosion" is commonly used to refer particularly to the rupture of a vessel or other enclosure. Even if flames are present within a vessel, this is not considered an explosion unless the vessel fails physically, i.e. is breached, shattered, melted, etc. Cases where flames are present but the vessel has not exploded are commonly referred to as "deflagrations", or alternatively as "incipient explosions". Explosion suppression typically focuses on extinguishing a deflagration before a vessel or enclosure actually explodes.

In addition, although the term "granular" is sometimes used to refer to materials that are particularly coarse, it is not used in this narrow sense herein. With respect to the claimed invention, "granular material" includes any flowable material composed of individual solid bodies. Thus, it includes extremely fine material such as flour and other powders, extremely coarse material such as large gravel, and material of intermediate coarseness such as sugar.

With regard to the exemplary case of explosion suppressing systems, at least three major types are known. None are entirely satisfactory.

So-called fixed spreader systems comprise a spreader assembly that extends into the volume that is to be protected. An example of a fixed spreader system 10 is shown in FIG.

1. As may be seen therein, a pressurizer 12 is connected to a reservoir 14 for suppressant. The pressurizer 12 and reservoir 14 are connected to a flange 16 that is mounted to the wall 18 of the vessel that is to be protected. A spreader head 20 extends past the wall 18, and into the interior of the vessel.

When activated, the pressurizer 12 puts pressure on the suppressant in the reservoir 14, and forces it through the spreader head 20. The suppressant spreads out from the spreader head 20 into the vessel, and extinguishes the deflagration, thus preventing the explosion.

Fixed spreader systems suffer from a number of disadvantages.

First, the spreader head 20 protrudes into the protected volume. Many volumes that are or might advantageously be protected from explosions include working machinery, such as grinders or mixers. If a fixed spreader system is to be used for such applications, the machinery must be designed so as to avoid the spreader head, or there is a risk of damage to either the machinery or the head itself.

Second, the open structure of the spreader head 20 protruding into the vessel provides many places where contaminants and/or bacteria may accumulate. This is a particular drawback for applications that require a high degree of hygiene, such as food and pharmaceutical processes.

Even if the spreader head 20 is somehow covered, as by a spreader cap 22, the need to arrange machines to avoid it leaves a "dead zone" surrounding the spreader head 20. Contaminants and bacteria can build up in this area as well.

Another known explosion suppressing system is the so-called flush system, illustrated in FIG. 2. Like a fixed spreader system 10, a flush spreader system 30 comprises a pressurizer 32 connected to a reservoir 34. The pressurizer 32 and reservoir 34 are connected to a spreader assembly 36 that is mounted to the wall 38 of the vessel that is to be protected.

The spreader assembly 36 does not penetrate the vessel wall 38, and thus it avoids some of the disadvantages of the spreader head 20.

However, conventional flush spreader assemblies 36 are extremely complex, requiring many parts, some of which move during operation. As a result, they are very difficult and expensive to build and install.

Furthermore, after an explosion suppressing system activates, it must be serviced. This includes such tasks as recharging the pressurizer, adding more suppressant, etc. It is also necessary to clean the system, and replace any parts that were damaged or worn when the system activated. Since conventional explosion suppressing systems operate at pressures of up to 900 psi or more, damage is not uncommon, and certain parts are considered disposable.

Because the flush spreader assembly 36 is so complicated, even servicing and even routine maintenance can be time-consuming and complex.

In addition, the highly complex mechanisms in the spreader assembly 36 provide opportunities for the accumulation of contaminants and the growth of bacteria.

A third known explosion suppressing system is the telescopic system, shown in FIG. 3.

As with other conventional systems, a telescopic spreader system 50 includes a pressurizer and a reservoir (not shown in FIG. 3). The pressurizer and reservoir are connected to a spreader assembly 52. The spreader assembly 52 is mounted at least proximate to, and sometimes in contact with, a flange 54 that is mounted to the wall 56 of the vessel that is to be protected. The flange defines an aperture 58 therethrough.

The aperture 58 is covered by a burst seal 60, which is held in place by a clamp ring 62 and sealed with a gasket 64.

The spreader assembly 52 includes a spreader head 66 disposed inside of a housing 68. The spreader head 66 is movable with respect to the housing 68. When activated, the spreader head 66 is propelled forward (to the left, as illustrated) and partially out of the housing 68. The spreader head 66 punches through the burst seal 60, extending past the vessel wall 56 and into the protected vessel. Suppressant flows through the spreader head 66, extinguishing or preventing explosions.

A shock ring 70 around the spreader head 66 helps to absorb the impact of the spreader head 66, and also seals the spreader head 66 against the housing 68.

The telescopic spreader system 50 also avoids some of the disadvantages of the fixed spreader system 10. While not in use, it does not extend into the volume it protects. However, in the event of an explosion or an impending explosion, the spreader head 66 enters the vessel at high speed. Thus, there is the potential for damage to machinery inside the vessel and/or the spreader head 66. Alternatively, there is a loss of capacity and the potential for the build-up of contaminants and bacteria if the area the spreader head 66 occupies when in use is left unoccupied.

Furthermore, though less complicated than a conventional flush spreader system 30, the telescopic spreader system 50 is also an extremely complex device, with moving parts, that must deploy at high speed.

In addition to the drawbacks noted with respect to each of the three conventional types of explosion suppressing systems, conventional systems of all types generally require components made of rubber, such as gaskets, shock rings, seals, etc. This is disadvantageous for several reasons.

Rubber tends to degrade over time. Although certain types of rubber are more stable than others, given a sufficient duration most or all will crumble, become brittle, etc. In addition, exposure to certain chemicals, particularly solvents but also other flammable vapors and dusts that may be present in the protected volume, is known to degrade most types of rubber.

Since explosive events are typically rare, explosion suppressing systems may remain dormant and ready for months or years at a time. If rubber components have deteriorated during that time, the systems may not work as designed.

Furthermore, most types of rubber are at least slightly porous, and/or absorb water. As such, they provide a suitable medium for the growth of many types of bacteria. This is true even if the rubber is relatively well sealed and protected. Thus, the use of rubber in spreaders poses a problem of cleanliness and hygiene.

SUMMARY OF THE INVENTION

It is the purpose of the claimed invention to overcome these difficulties, thereby providing an improved apparatus and method for distributing granular material, and in particular for suppressing explosions.

An exemplary embodiment of an apparatus in accordance with the principles of the claimed invention includes a flange. The flange is disposed proximate the volume in which explosions are to be suppressed, and hence to which an explosion suppressant is to be distributed.

A burst seal is affixed to the flange.

A spreader insert is disposed proximate the flange, and may be in contact with it. The insert defines at least one aperture therethrough. The aperture or apertures generally form the shape of one or more annuli. That is, taken together, the apertures approximate rings in shape. It has been determined that such a configuration of apertures produces an unusually broad angular distribution of suppressant, herein referred to as the effective spread.

The insert is aligned with the flange such that the apertures are aligned with the seal.

The insert is adapted to be connected with a source of pressurized, granular suppressant. When pressurized suppressant is applied to the insert, it passes through the apertures, bursts the seal, and is directed into the protected volume by the insert.

In a preferred embodiment, the suppressant is distributed with an effective spread of at least 60 degrees. In a more preferred embodiment, the suppressant is distributed with an effective spread of at least 90 degrees. In an even more preferred embodiment, the suppressant is distributed with an effective spread of at least 100 degrees. In a still more preferred embodiment, the suppressant is distributed with an effective spread of at least 110 degrees. In a yet more preferred embodiment, the suppressant is distributed with an effective spread of at least 120 degrees.

In another preferred embodiment, the apparatus includes no rubber components.

In yet another preferred embodiment, the apparatus is made entirely of metal. In a more preferred embodiment, the apparatus is made entirely of stainless steel.

In a preferred embodiment, the apparatus has no functionally moving parts.

In still another preferred embodiment, the apparatus is adapted to be hygienically sealed.

In another preferred embodiment, each aperture defines a centerline thereof. The centerline of each aperture is at a uniform angle to the surface of the insert that is closest to the burst seal. In a more preferred embodiment, the angle of each aperture ranges between 30 and 65 degrees.

In an alternative embodiment, the insert may define apertures generally in the shape of two or more annuli. In a preferred embodiment, the multiple annuli are concentric.

In a preferred embodiment, the flange is adapted to be mounted flush to a surface, such as a vessel wall, so that it does not protrude into or past that surface, and into the volume that is to be protected when dormant, and such that only the burst seal protrudes past the wall and into the vessel when activated.

BRIEF DESCRIPTION OF THE DRAWINGS

Like reference numbers generally indicate corresponding elements in the figures.

DETAILED DESCRIPTION OF THE PREFERRED EMBODIMENT

Figure 4:
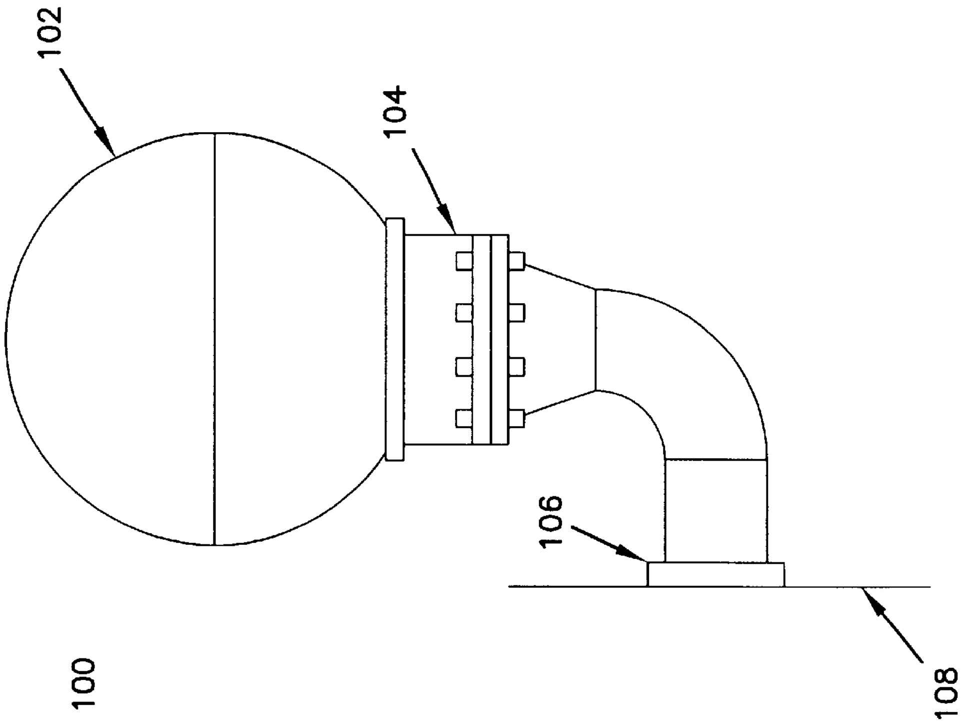
FIG. 4 is a cross section of an exemplary embodiment of an apparatus for explosion suppression in accordance with the principles of the claimed invention.

Referring to FIG. 4, an apparatus 100 for suppressing explosions in accordance with the principles of the claimed invention includes a pressurizer 102 connected to a reservoir 104 for suppressant.

A variety of pressurizers 102 may be suitable for use with the claimed invention. As shown, the pressurizer 102 is a pressure vessel, of the sort that might contain air or a gas such as nitrogen under high pressure. However, this is exemplary only. Other pressurizers 102, including but not limited to high-pressure air or gas lines, and chemicals that react to produce high-pressure gas on demand, may be equally suitable. So long as the pressurizer 102 supplies sufficient pressure to operate the apparatus 100, its precise form is not critical to the invention.

The amount of pressure provided by the pressurizer 102 likewise is not critical. It is generally advantageous that explosion suppressing systems operate very quickly, since there is often little time available to respond to an explosion. Thus, the pressure provided by the pressurizer is typically high, in the range of 400 psi to 900 psi. Under such pressure, an apparatus in accordance with the principles of the claimed invention can activate within less than 50 milliseconds. However, these pressures and times are exemplary only. Other pressures and other activation times may be equally suitable.

Likewise, a variety of reservoirs 104 may be suitable for use with the claimed invention. It will be appreciated by those of skill in the art that the particulars of the reservoir 104 will depend in large part upon the nature of the explosions that are to be suppressed (i.e. fuel type, size, etc.), and upon the type of suppressant that is to be used. As these conditions may vary widely from embodiment to embodiment, the size, shape, and configuration of the reservoir 104 likewise may vary substantially.

The pressurizer 102 and reservoir 104 are in communication with a spreader 106. As illustrated in FIG. 4, at least a portion of the spreader 106 is connected to the wall 108 of a vessel that is to be protected. This may be advantageous for certain embodiments, wherein the vessel wall 108 is a sturdy, well-defined location, suitable for attaching a high-pressure device such as the explosion suppressing apparatus 100. However, it is exemplary only. Other arrangements, including but not limited to free-standing arrangements, and arrangements wherein the spreader 106 is connected indirectly via a mounting pad or other reinforcing structure that is connected to the vessel wall 108, may be equally suitable. So long as the spreader 106 is proximate the volume that is to be protected, it may be disposed in a variety of positions and configurations.

It should also be noted that in a preferred embodiment such as that illustrated in FIG. 4, the spreader 106 is flush with the inner surface of the wall 108. This is also advantageous, for at least the reason that while it enables the apparatus 100 access to the vessel so as to suppress explosions therein, no part of the apparatus 100 protrudes into the vessel while the apparatus 100 is dormant. Thus, none of the vessel's volume is occupied by the apparatus 100, no ledges, undercuts, etc. are present where product may accumulate, and there is no risk of contact between the apparatus 100 and machinery or other moving parts within the vessel. However, this arrangement is exemplary only.

In a preferred embodiment, the spreader 106 is fixedly mounted to the wall 108 of the vessel, for example by welding or other durable, permanent means, in such a way as to be flush with the wall 108. However, as noted, such an arrangement is exemplary only.

Figure 1:
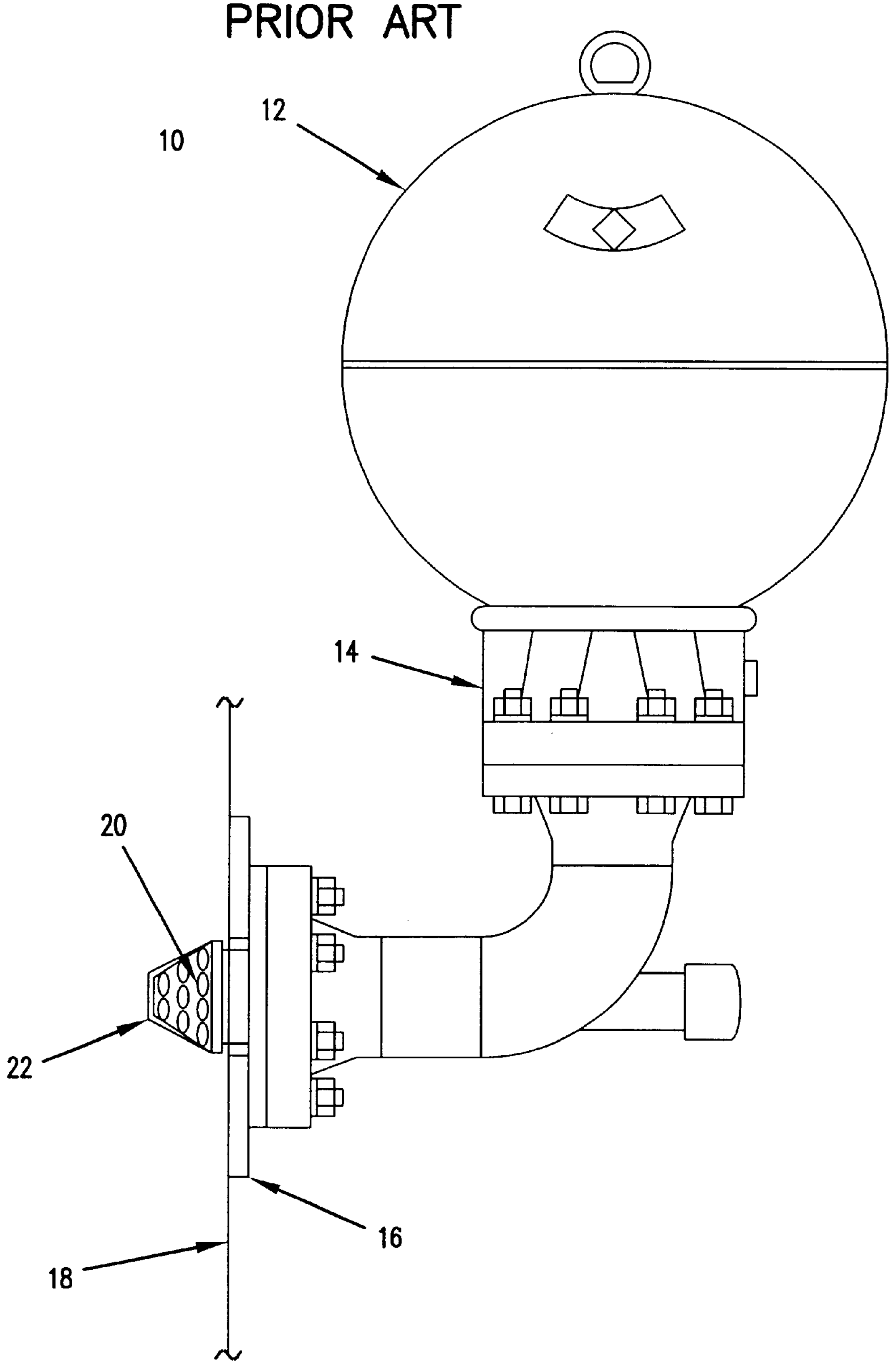
FIG. 1 PRIOR ART
FIG. 1 is a representation of a fixed spreader system, as known from the prior art.
Figure 2:
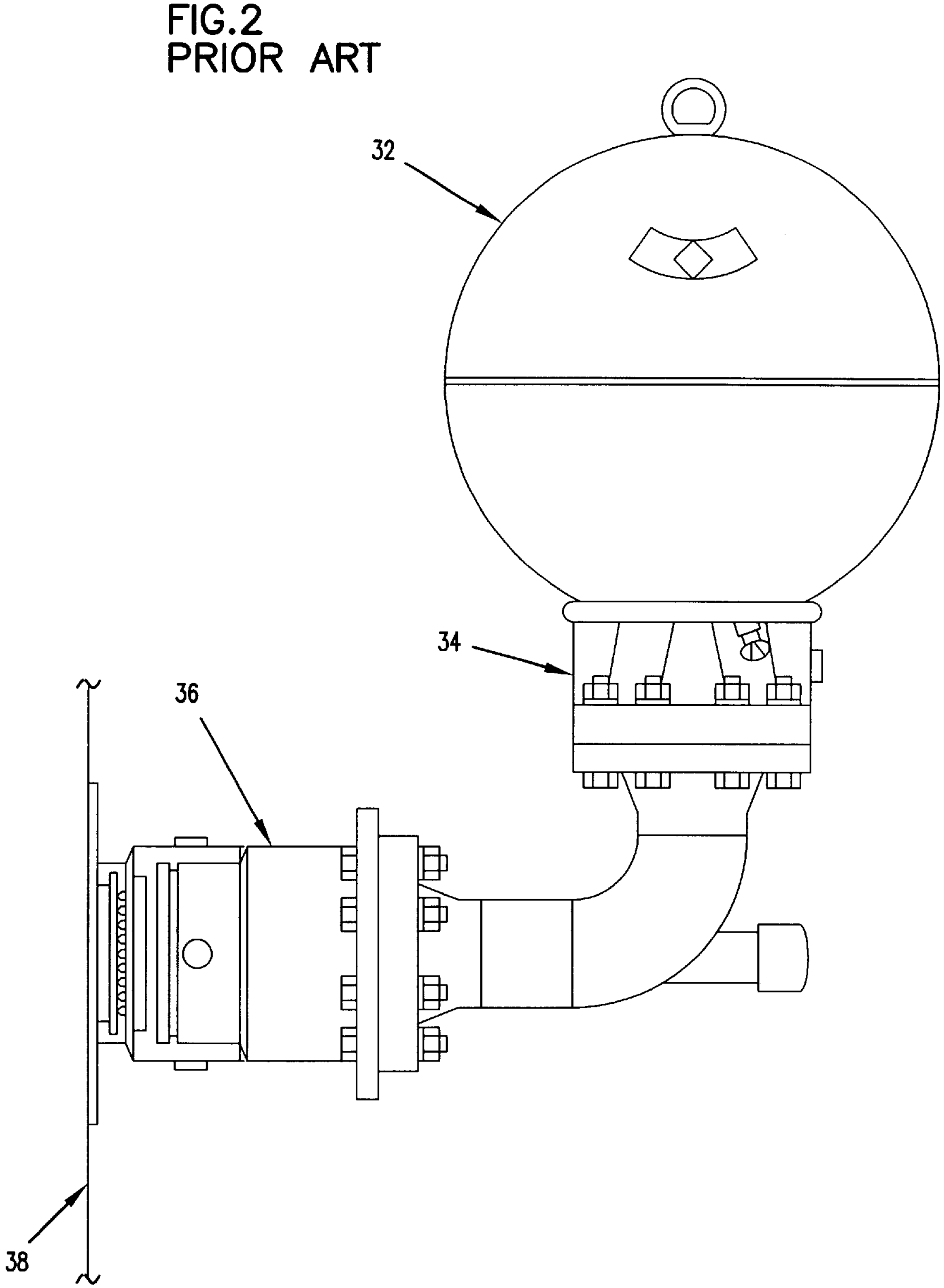
FIG.2 PRIOR ART
FIG. 2 is a representation of a flush spreader system, as known from the prior art.
Figure 3:
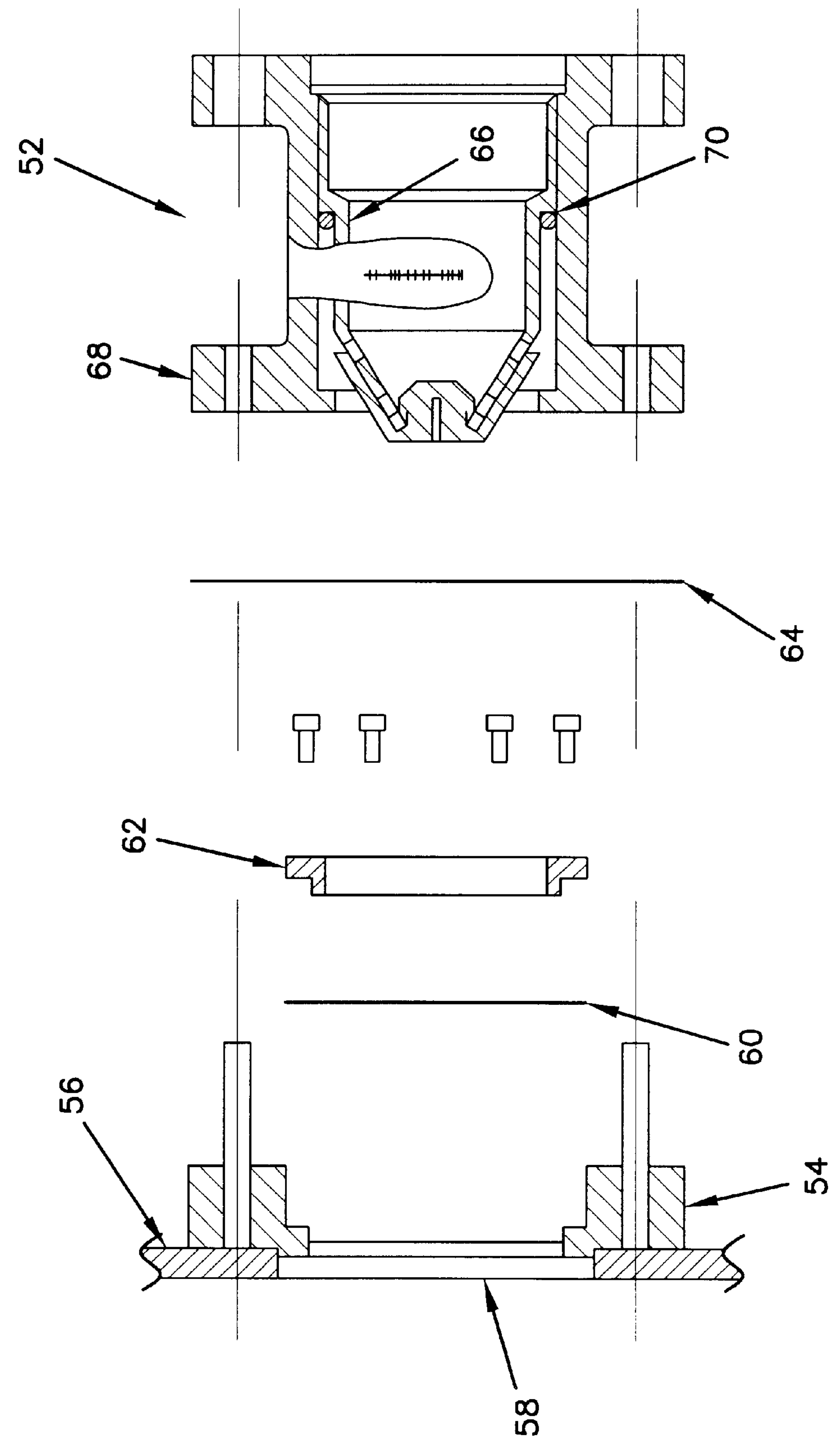
FIG.3 PRIOR ART
FIG. 3 is a representation of a telescopic spreader system, as known from the prior art.
Figure 5:
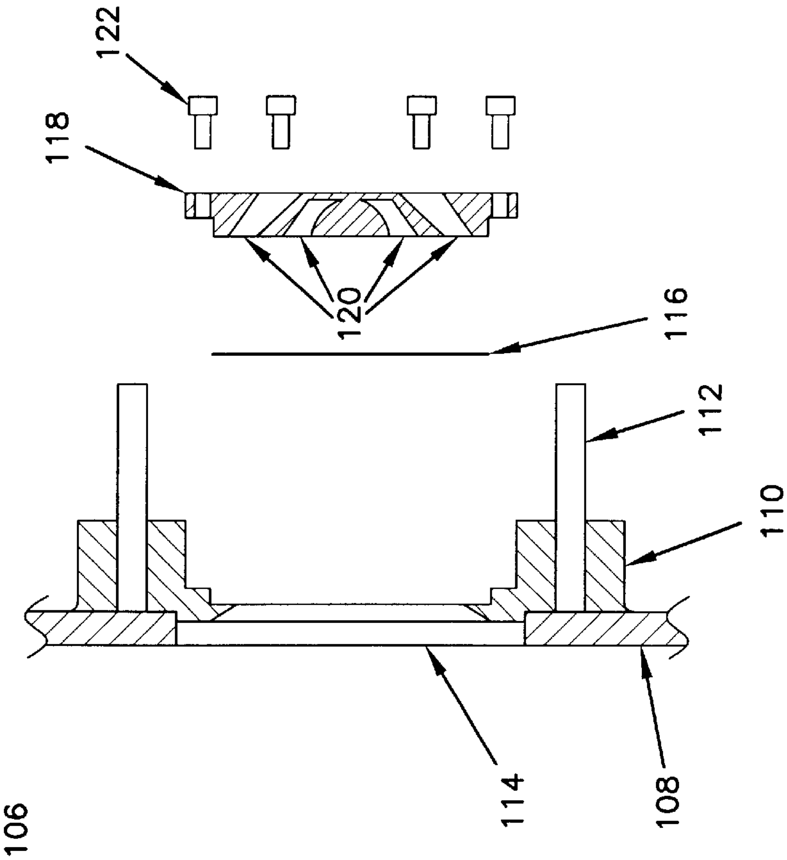
FIG. 5 is an exploded cross section of a portion of the embodiment in FIG. 4, enlarged to show detail.

FIG. 5 shows a magnified view of the spreader 106 and the elements thereof. The elements shown therein are exploded for clarity. In use, they would be assembled as described below.

The spreader 106 includes a flange 110 that is disposed proximate the volume that is to be protected from explosions. As previously noted, in a preferred embodiment, at least a portion of the spreader 106 is fixedly mounted to the wall 108 of the vessel. In a preferred embodiment, the fixedly mounted portion is the flange 110. It is this configuration that is illustrated in FIG. 5.

In such a configuration, the flange 110 provides support to the remainder of the spreader 106, and provides a connection point for the spreader 106 and apparatus 100 as a whole to the vessel wall 108.

The flange 110 may be made of any suitably durable material. In a preferred embodiment, the flange 110 is made of a material that is both stable over time and resistant to the growth of microorganisms. In a more preferred embodiment, the flange 110 is made of metal. In a still more preferred embodiment, the flange 110 is made of stainless steel, including but not limited to 316 stainless steel. In an alternative preferred embodiment, the flange 110 is made of a nickel alloy, including but not limited to a HASTELLOY® nickel alloy. However, this is exemplary only, and other materials, including but not limited to plastic, may be equally suitable.

In a preferred embodiment, the flange 110 is connected in some conveniently removable fashion to the pressurizer 102 and the reservoir 104, so as to facilitate maintenance and recharging of the apparatus 100. As illustrated, the flange 110 includes studs 112 for this purpose. However, this arrangement for connecting the flange 110 is exemplary only, and other arrangements may be equally suitable.

In embodiments wherein the flange 110 is fixedly mounted to a vessel wall 108, the wall 108 may define an intake aperture 114 therein. The flange 110 would then be affixed to the wall 108 over the intake aperture 114, so that suppressant from the apparatus 100 could pass through the intake aperture 114. However, this is exemplary only, and other arrangements for passing suppressant through the wall 108 may be equally suitable. For example, the wall 108 might include a movable panel or hatch, a separable portion that is blown free from the remainder of the wall 108, a sacrificial portion that is broken, etc. Furthermore, as previously noted, mounting the flange 110 to a vessel wall 108 is itself exemplary only.

As shown in FIG. 5, the spreader 106 includes a burst seal 116 that seals off the internal components of the spreader 106 from the vessel or other volume that is to be protected. It prevents contamination of the apparatus 100. The burst seal 116 is adapted to rupture under pressure from the pressurizer 102, so that suppressant may enter the vessel and extinguish or prevent an explosion.

Although as shown in the exemplary embodiment of FIG. 5 the burst seal 116 is separated from the flange 110, in use the burst seal 116 is disposed proximate the flange 110, and is arranged in such a way as to form a tight seal. Likewise, in embodiments wherein the wall 108 defines an intake aperture 114, the burst seal 116 is disposed so as to be aligned with the intake aperture 114, so that suppressant passing through the ruptured burst seal 116 may enter the protected volume.

The burst seal 116 may be constructed using a variety of materials. In a preferred embodiment, the burst seal 116 is made of a material that is both stable over time and resistant to the growth of microorganisms. In a more preferred embodiment, the burst seal 116 is made of metal. In a still more preferred embodiment, the flange burst seal 116 is made of stainless steel, including but not limited to 316 stainless steel. In an alternative preferred embodiment, the burst seal 116 is made of a nickel alloy, including but not limited to a HASTELLOY® nickel alloy. However, this is exemplary only, and other materials, including but not limited to plastic, may be equally suitable.

The burst seal 116 must be sufficiently rupturable so as to burst when the apparatus 100 is activated, but is also advantageously lightweight and flexible so that the burst seal 116 does not damage the vessel or internal mechanisms within the vessel when the it ruptures and protrudes into the vessel. Advantageously the burst seal 116 is at least reasonably durable, so that it does not rupture unintentionally. It is noted that the pressures typical of an exemplary explosion suppression apparatus 100 are relatively high, in the range of 400 to 900 psi. Thus, the burst seal 116 may be made strong enough to handle general wear over time, without compromising its ability to rupture on demand, since the force of rupture is substantial.

Figure 8:
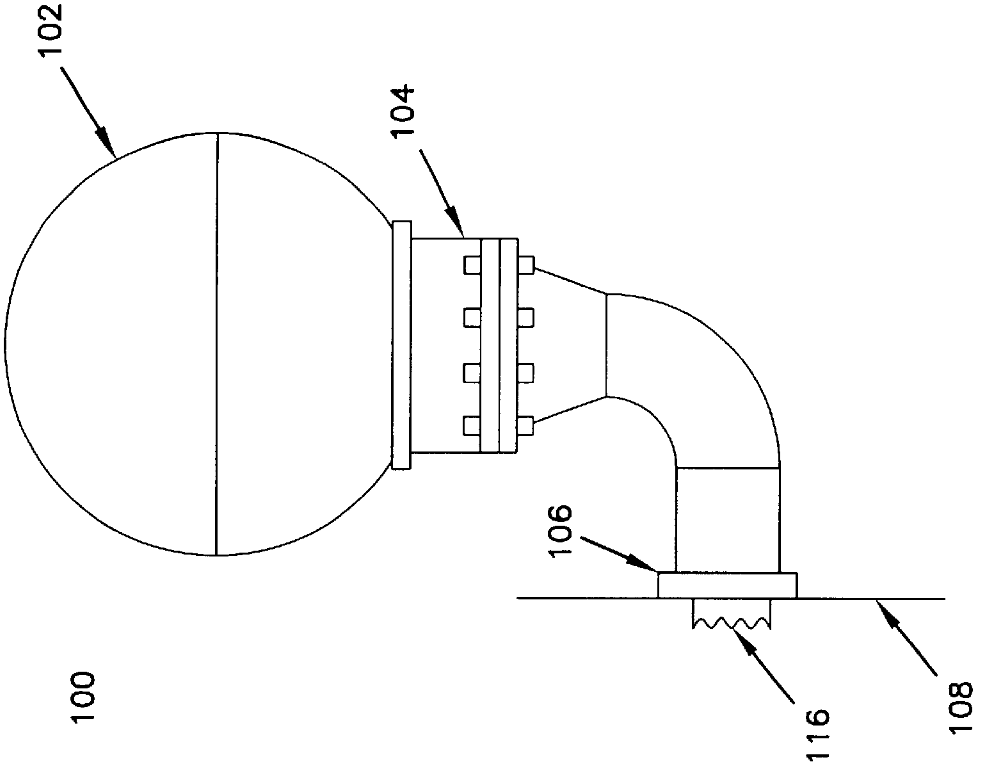
FIG. 8 is a cross section of the embodiment shown in FIG. 4, with the burst seal burst.

FIG. 8 shows the exemplary embodiment of FIG. 4, with the burst seal 116 ruptured, and protruding past the wall 108. It is noted that, because the burst seal 116 is advantageously lightweight and flexible, even if it comes in contact with the wall 108 or a mechanism or product within the vessel, it is unlikely to cause damage.

Burst seals are well known, and are not described further herein.

The spreader 106 also includes a spreader insert 118. The spreader insert 118 serves to distribute high-pressure explosion suppressant supplied thereto into the protected volume. The spreader insert 118 defines at least one aperture 120 therethrough, through which suppressant may pass.

The spreader insert 118 may be made of any suitably durable material. In a preferred embodiment, the spreader insert 118 is made of a material that is both stable over time and resistant to the growth of microorganisms. In a more preferred embodiment, the spreader insert 118 is made of metal. In a still more preferred embodiment, the spreader insert 118 is made of stainless steel, including but not limited to 316 stainless steel. In an alternative preferred embodiment, the spreader insert 118 is made of a nickel alloy, including but not limited to a HASTELLOY® nickel alloy. However, this is exemplary only, and other materials, including but not limited to plastic, may be equally suitable.

Although as shown in the exemplary embodiment of FIG. 5 the spreader insert 118 is separated from the flange 110, in use the spreader insert 118 is disposed proximate the flange 110 such that the at least one aperture 120 is aligned with the burst seal 116. In this way, pressure from the pressurizer 102 may reach the burst seal 116 to make it burst, and suppressant from the reservoir 104 may pass through the ruptured burst seal 116 and the intake aperture 114 to reach the protected volume.

In a preferred embodiment, the spreader insert 118 is connected in some conveniently removable fashion to the flange 110, so as to facilitate maintenance and recharging of the apparatus 100. As illustrated, the spreader 106 includes screws 122 for this purpose. However, this arrangement for connecting the spreader insert 118 is exemplary only, and other arrangements may be equally suitable.

As evidenced by the preceding description, it is noted that no rubber is necessary in the construction of the spreader 106. In a preferred embodiment, the spreader may be made entirely of metal. In a more preferred embodiment, the spreader may be made entirely or in part of stainless steel, including but not limited to 316 stainless steel. In an alternative preferred embodiment, the spreader may be made entirely or in part of nickel alloy, including but not limited to a HASTELLOY® nickel alloy. However this is exemplary only.

It is also noted that the spreader 106 does not require any functionally moving parts. The term "functionally moving parts" is used herein to indicated that no parts are required to move in order for the spreader 106 to be operable. Some motion of the spreader 106 as a whole and/or the components thereof may be possible in certain embodiments, given the very high operating pressure of the device, without any of the parts being "moving parts" in any meaningful sense.

In a preferred embodiment, the spreader 106 has no functionally moving parts. However, this is exemplary only.

It is further noted that the spreader 106 may be constructed with few separate components, and that the components required may be reduced to relatively simple structures.

It is additionally noted that the spreader 106 as illustrated does not protrude into the protected volume, i.e. it does not protrude past the vessel wall 108, when the spreader 106 is dormant awaiting activation. Protrusion into the protected volume is not necessary while dormant, and in a preferred embodiment the spreader 106 does not protrude at all into the protected volume until operation, at which time, only the burst seal 116 protrudes into the protected volume. However, this is exemplary only.

Figure 6:
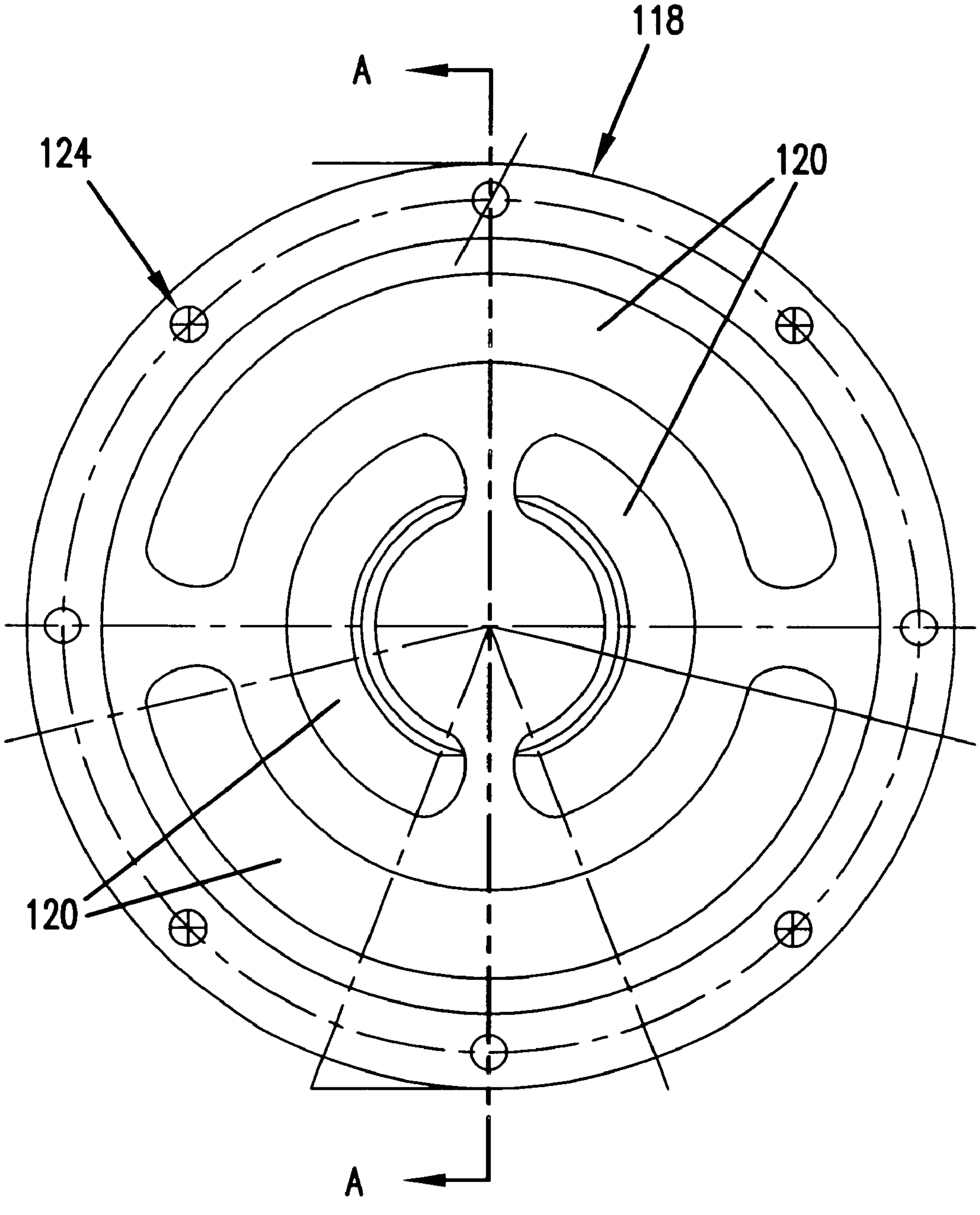
FIG. 6 is a view of an exemplary embodiment of a spreader insert in accordance with the principles of the claimed invention, seen from the second surface.

As may be seen from FIG. 6, the apertures 120 in the spreader insert 118 substantially define at least one annulus. It will be appreciated by those of skill in the art that a completely annular aperture 120 is problematical, in that it would require a disk of material in the center of the aperture 120 to float unsupported. However, the apertures 120 that are present approximate the shape of one or more annuli.

Although as illustrated in FIG. 6, each annulus is formed by two apertures 120 that each define approximately half of the annulus in question, this is exemplary only. A single aperture 120 may be shaped so as to substantially define an annulus. Likewise, three or more apertures 120 may be shaped and arranged so as to substantially define an annulus.

In some embodiments, the spreader insert 118 defines more than one annulus. For example, as shown in FIG. 6, the spreader insert 118 defines two annuli. In such cases, it is preferable that the annuli are arranged concentrically with one another. However, this is exemplary only.

In addition to the apertures 120 for passing suppressant, the spreader insert 118 may also define additional apertures 124 for other purposes. For example, the spreader insert 118 may define screw apertures for receiving therein the screws 122 shown in FIG. 5. In such instances, it is not necessary for the additional apertures 124 to define an annulus.

It is noted that although the spreader insert 118 is shown in FIG. 6 to be generally circular in shape, this is exemplary only. Other shapes may be equally suitable, including but not limited to hexagons, squares, and other polygonal shapes.

In a preferred embodiment, the apertures 120 are defined such that the spreader insert 118 directs suppressant passing therethrough with an effective spread of at least 60 degrees.

In a more preferred embodiment, the apertures 120 are defined such that the spreader insert 118 directs suppressant passing therethrough with an effective spread of at least 90 degrees.

In an even more preferred embodiment, the apertures 120 are defined such that the spreader insert 118 directs suppressant passing therethrough with an effective spread of at least 100 degrees.

In a still more preferred embodiment, the apertures 120 are defined such that the spreader insert 118 directs suppressant passing therethrough with an effective spread of at least 110 degrees.

In a yet more preferred embodiment, the apertures 120 are defined such that the spreader insert 118 directs suppressant passing therethrough with an effective spread of at least 120 degrees.

It is noted that the effective spread of an explosion suppressant is not the same as the total spread thereof. Suppressant may be visibly distributed across spreads much wider than 120 degrees. However, suppressant is generally visible across a much greater spread than the spread in which it is actually effective in suppressing explosions.

For example, in conventional suppression systems, the outermost portion of a cited spread may not receive enough suppressant to suppress an explosion in that area.

As applied herein, the term "effective spread" refers to the angle, typically though not necessarily centered on the axis of the spreader insert 118, to which enough suppressant is delivered to suppress an actual explosion.

Figure 7:
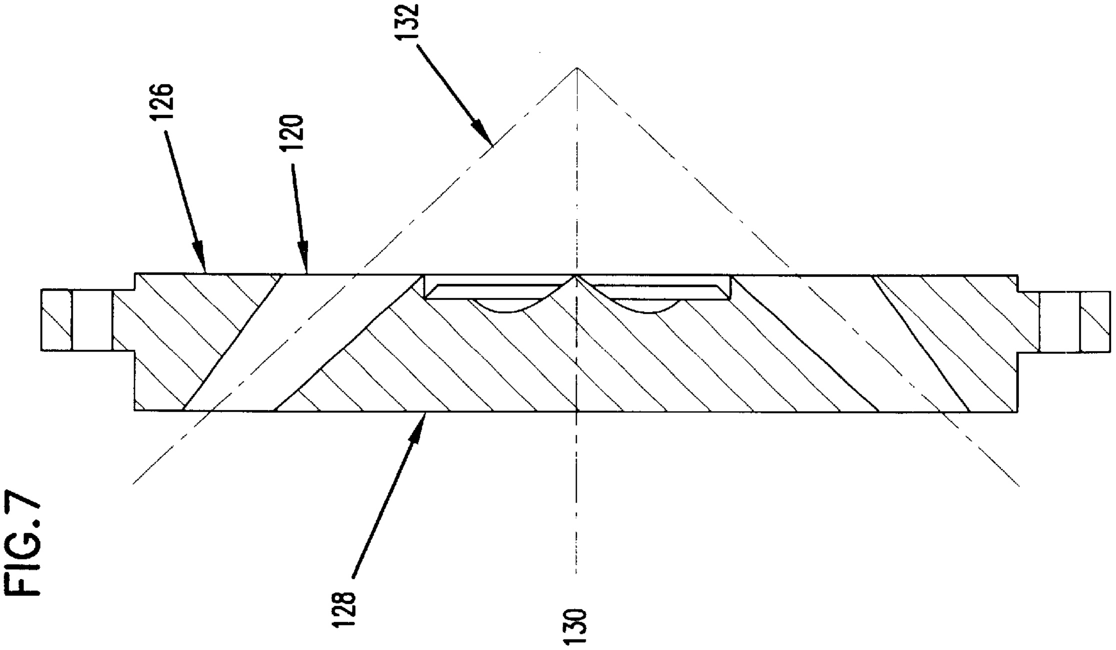
FIG. 7 is a cross section of the spreader insert from FIG. 6, along line A—A.

As shown in FIG. 7, the spreader insert 118 has a first surface 126 that is distal from the burst seal 116 (faces away from it), and a second surface 128 that is proximate the burst seal 116 (faces toward it). As shown in FIG. 7, the first and second surfaces 126 and 128 are both flat and parallel, however, this is exemplary only. Other arrangements, including but not limited to convex, concave, and angled first and second surfaces 126 and 128 may be equally suitable.

Regardless of its precise configuration, the spreader insert 118 defines an axis 130 therethrough. Likewise, the apertures 120 define centerlines 132 thereof. In a preferred embodiment, the centerlines 132 of the apertures 120 are not parallel to the axis 130 of the spreader insert 118, but rather form an angle therewith.

As shown in FIG. 7, the apertures 120 need not be of uniform size throughout the thickness of the spreader insert 118. In particular, the surfaces of the apertures may form angles with respect to the axis 130 of the spreader insert 118. The angles formed by each surface with the axis 130 may be different from the angle formed by the centerline 132, and may be different from one another. Furthermore, these angles need not be uniform.

In addition, the angles for different annuli may be different.

In a preferred embodiment, the angle between the centerlines 132 of the apertures 120 and the axis 130 of the spreader insert 118 is optimized to produce a maximum effective spread of suppressant.

It will be appreciated by those of skill in the art that the precise angle or angles necessary to produce a maximum effective spread of suppressant may vary depending on the particulars of each embodiment. For example, the grain size of the suppressant, the effectiveness of the suppressant per unit mass, the applied pressure, etc. may all affect the optimum angles.

However, in a preferred embodiment, this angle is between 35 and 65 degrees, inclusive.

The above specification, examples and data provide a complete description of the manufacture and use of the composition of the Invention. Since many embodiments of the invention can be made without departing from the spirit and scope of the invention, the invention resides in the claims hereinafter appended.

What is claimed is:

1. Apparatus for explosion suppression, comprising:

a flange proximate a volume wherein explosions are to be suppressed;

a burst seal affixed to said flange; and a spreader insert defining at least one aperture therethrough, said at least one aperture substantially defining at least one annulus, said insert being disposed proximate said flange such that said at least one aperture is aligned with said seal, said spreader insert being adapted to be connected to a source of pressurized explosion suppressant;

wherein said seal is adapted to be burst by the suppressant, and said insert is adapted to direct the suppressant through said at least one aperture with an effective spread of at least 60 degrees; and said flange is adapted to be flush-mounted to a wall of a vessel so as to direct the suppressant into the vessel, wherein during or after activation of said apparatus only said burst seal protrudes past said wall into said vessel, and when said apparatus is dormant no portion of said apparatus protrudes past said wall into said vessel.

2. The apparatus according to claim 1, wherein:

said apparatus comprises no rubber components.

3. The apparatus according to claim 1, wherein:

said apparatus consists entirely of metal.

4. The apparatus according to claim 3, wherein:

said apparatus comprises stainless steel.

5. The apparatus according to claim 3, wherein:

said apparatus comprises nickel alloy.

6. The apparatus according to claim 1, wherein:

said apparatus comprises no functionally moving parts.

7. The apparatus according to claim 1, wherein:

said apparatus is adapted to be hygienically sealed.

8. The apparatus according to claim 1, wherein:

said insert defines an axis thereof; and said at least one aperture defines a centerline thereof, said centerline being arranged at an angle with said axis, said angle being 30 to 65 degrees.

9. The apparatus according to claim 1, wherein:

said at least one aperture substantially defines at least two annuli.

10. The apparatus according to claim 9, wherein:

said annuli are concentric.

11. Apparatus for explosion suppression, comprising:

a flange proximate a volume wherein explosions are to be suppressed;

a burst seal affixed to said flange; and a spreader insert defining at least one aperture therethrough, said at least one aperture substantially defining at least one annulus, said insert being disposed proximate said flange such that said at least one aperture is aligned with said seal, said spreader insert being adapted to be connected to a source of pressurized explosion suppressant;

wherein said seal is adapted to be burst by the suppressant, and said insert is adapted to direct the suppressant through said at least one aperture with an effective spread of at least 60 degrees; and said apparatus is adapted to be hygienically sealed, such that said burst seal is disposed between said spreader insert and said volume wherein explosions are to be suppressed.

12. The apparatus according to claim 11, wherein:

said apparatus comprises no rubber components.

13. The apparatus according to claim 11, wherein:

said apparatus consists entirely of metal.

14. The apparatus according to claim 13, wherein:

said apparatus comprises stainless steel.

15. The apparatus according to claim 13, wherein:

said apparatus comprises nickel alloy.

16. The apparatus according to claim 11, wherein:

said apparatus comprises no functionally moving parts.

17. The apparatus according to claim 11, wherein:

said insert defines an axis thereof; and said at least one aperture defines a centerline thereof, said centerline being arranged at an angle with said axis, said angle being 30 to 65 degrees.

18. The apparatus according to claim 11, wherein:

said at least one aperture substantially defines at least two annuli.

19. The apparatus according to claim 18, wherein:

said annuli are concentric.

* * * * *